US012750933B2

(12) United States Patent
Wu

(10) Patent No.: US 12,750,933 B2
(45) Date of Patent: Sep. 29, 2026

(54) DRIVING SYSTEM FOR A LIGHTING APPARATUS

(71) Applicant: Renesas Design (UK) Limited, Bourne End (GB)

(72) Inventor: Chang Yu Wu, Tainan (TW)

(73) Assignee: Renesas Design (UK) Limited, Bourne End (GB)

(*) Notice: Subject to any disclaimer, the term of this patent is extended or adjusted under 35 U.S.C. 154(b) by 61 days.

(21) Appl. No.: 18/619,445

(22) Filed: Mar. 28, 2024

(65) Prior Publication Data

US 2025/0311074 A1 Oct. 2, 2025

(51) Int. Cl.

| | |
|---|---|
| ***H05B 45/305*** | (2020.01) |
| ***H05B 45/46*** | (2020.01) |
| ***H05B 47/11*** | (2020.01) |
| ***H05B 47/155*** | (2020.01) |
| ***H05B 47/17*** | (2020.01) |

(52) U.S. Cl.

CPC ........... *H05B 45/305* (2020.01); *H05B 45/46* (2020.01); *H05B 47/11* (2020.01); *H05B 47/155* (2020.01); *H05B 47/17* (2020.01)

(58) Field of Classification Search

CPC .... H05B 45/305; H05B 47/11; H05B 47/155; H05B 47/17; H05B 45/10; H05B 45/20

See application file for complete search history.

(56) References Cited

U.S. PATENT DOCUMENTS

2013/0049637 A1* 2/2013 Chen ...................... H05B 45/46 315/297
2022/0240356 A1* 7/2022 Lee ........................ H05B 45/10
2023/0269845 A1* 8/2023 Chou ..................... H05B 45/54 315/294

* cited by examiner

*Primary Examiner* — Renan Luque

(74) *Attorney, Agent, or Firm* — SCULLY, SCOTT, MURPHY & PRESSER, P.C.

(57) ABSTRACT

A driving system for a lighting apparatus comprising a plurality of light sources, the driving system comprising a controller configured to provide a first digital control signal to the lighting apparatus, the first digital control signal having a first duty cycle and a first frequency, and control the first frequency of the first digital control signal.

19 Claims, 12 Drawing Sheets

DRIVING SYSTEM FOR A LIGHTING APPARATUS

The present disclosure relates to a driving system for a lighting apparatus comprising a plurality of light sources. In particular, the present disclosure relates to a driving system for providing a digital control signal to the lighting apparatus.

BACKGROUND

FIG. 1 is a schematic of a known dual channel solid state lighting (SSL) driving system 100 for driving a lighting apparatus 102. The lighting apparatus 102 comprises an AC/DC converter 104 to provide a constant voltage Vbus, a DC/DC converter 106 to provide a constant current ILED, two MOSFETs with a complementary duty ratio 108 to adjust the duty ratio of the LED current, two opto-couplers 110, 112 to provide electrical isolation and two interface devices 114, 116.

During operation, the interface devices 114, 116 provide the fixed frequency PWM signals of dimming information to the DC/DC converter 106 and the MOSFETs 108 according to the receiving signals from dimming sources 118, 120.

The lighting apparatus 102 comprises LED channels 122, 124 which may, for example, comprise LED strings each comprising a plurality of LEDs. The LED channels 122, 124 may provide different colors. For example, the LED channel 122 may be cold-white, and the LED channel 124 may be warm-white.

In the present example, two mechanisms are used to control the brightness of the LED channels 122, 124. In operation, the dimming source 118 controls the constant current ILED while the dimming source 120 controls the duty cycle for both LED channels 122, 124. The duty cycle may be referred to as the duty ratio.

With regards to the dimming source 118 providing D1, the dimming source 118 can control the duty cycle of D1, and D1 can then adjust the brightness of the LED channels 122, 124 which is related to the total current flowing through the LED channels 122, 124, as provide by the current ILED.

With regards to the dimming source 120 providing D2, during operation, each LED channel is controlled by a digital signal having a duty cycle, where the duty cycle is the ratio of the on time of the digital signal to the off time. "On time" refers to the time period over which the digital signal would be used to switch on an LED channel, to permit current flow and therefore illumination of the LED channel. "Off time" refers to the time period over which the digital signal would be used to switch off an LED channel to prevent current flow.

Using the digital signal, an LED channel is rapidly turned on and off. The average current flow through an LED channel relates to duty cycle of the control signal. As brightness relates to the average current flow, the brightness of the LED channel can be controlled by adjusting the duty cycle. This method is referred to as "dimming" to indicate that control of the duty cycle can be used to "dim" the LED channel.

The MOSFETs 108 are arranged such that when the duty cycle of D2 is provided to one of the two MOSFETs, the other receives the inverse duty cycle of D2, thereby enabling adjustment of the ratio of current flow through the LED channels 122, 124. Specifically, when one MOSFET receives a high duty cycle, the other receives a low duty cycle, with the sum of the two duty cycles being 100%.

The dimming source 120 can control the duty cycle of D2, and D2 can then adjust the color temperature, which is related to the ratio of the current flowing through the LED channels 122, 124. In this way, the users can adjust the brightness and the color temperature by the two dimming sources 118, 120.

In summary, the dimming source 118 is used to control the current ILED received by both LED channels 122, 124, thereby being used to control their brightness. The dimming source 120 is used to control the MOSFETs 108 which are arranged such that as one LED channel is increased in brightness, the other LED channel is decreased, thereby providing a method to control colour temperature.

Systems such as those shown in FIG. 1 may be applied for lighting applications such as those relating to display technology, for example for LED displays.

Existing systems, such as those shown in FIG. 1, exhibit camera flicker that may not meet the flicker standard.

SUMMARY

It is desirable to provide an improved driving system for a lighting apparatus when compared to known systems.

Specifically, it is desirable to provide a driving system that can reduce camera flicker when compared to known systems. Furthermore, it is desirable to improve dimming performance over known systems.

According to a first aspect of the disclosure there is provided a driving system for a lighting apparatus comprising a plurality of light sources, the driving system comprising a controller configured to provide a first digital control signal to the lighting apparatus, the first digital control signal having a first duty cycle and a first frequency, and control the first frequency of the first digital control signal.

Optionally, each of the plurality of light sources comprises at least one light element.

Optionally, at least of the light elements comprises a light emitting diode (LED).

Optionally, the lighting apparatus comprises a power converter system configured to provide a first voltage or a first current to the plurality of light sources.

Optionally, the brightness of the lighting apparatus is dependent on the first voltage or the first current.

Optionally, the power converter system comprises an AC/DC converter.

Optionally, the AC/DC converter is configured to receive the AC input and to provide the first current or the first voltage.

Optionally, the power converter system comprises a DC/DC converter.

Optionally, the AC/DC converter is configured to receive an AC input and to provide a constant voltage to the DC/DC converter and the DC/DC converter is configured to provide the first current or the first voltage.

Optionally, the controller is configured to provide the first digital control signal to the power converter system, and the first current or the first voltage is dependent on the first digital control signal.

Optionally, the lighting apparatus comprises a switching arrangement comprising a plurality of switches, each of the plurality of switches being coupled to at least one of the plurality of light sources.

Optionally, each of the plurality of switches comprises a bipolar junction transistor (BJT) or a metal oxide semiconductor field effect transistor (MOSFET).

Optionally, the controller is configured to provide the first digital control signal to the switching arrangement, and an average current flow through each of the plurality of light sources is dependent on the first digital control signal.

Optionally, the ratio of the average current flow through each of the plurality of light sources is dependent on the first digital control signal.

Optionally, the colour temperature of the lighting apparatus is dependent on the ratio of the average current flow through each of the plurality of light sources.

Optionally, the plurality of light sources comprises a first light source and a second light source, and the plurality of switches comprises a first switch and a second switch, the first switch being coupled to the first light source and the second switch being coupled to the second light source, and the first and second switches are configured to provide an inverse relationship between the average current flowing through the first light source and the average current flowing through the second light source.

Optionally, the controller is configured to provide a second digital control signal to the lighting apparatus, the second digital signal having a second duty cycle and a second frequency, and control the second frequency of the second digital control signal.

Optionally, the plurality of light sources comprises a first light source and a second light source, and the plurality of switches comprises a first switch and a second switch, the first switch being coupled to the first light source and the second switch being coupled to the second light source, and the controller is configured to provide the first digital control signal to the first switch, an average current flow through the first light source being dependent on the first digital control signal, and provide the second digital control signal to the second switch, an average current flow through the second light source being dependent on the second digital control signal.

Optionally, the lighting apparatus comprises a power converter system configured to provide a first voltage or a first current to the plurality of light sources.

Optionally, the power converter system comprises an AC/DC converter.

Optionally, the AC/DC converter is configured to receive the AC input and to provide the first current or the first voltage.

Optionally, the power converter system comprises a DC/DC converter.

Optionally, the AC/DC converter is configured to receive an AC input and to provide a constant voltage to the DC/DC converter and the DC/DC converter is configured to provide the first current or the first voltage.

Optionally, the controller is configured to provide a second digital control signal to the lighting apparatus, the second digital signal having a second duty cycle and a second frequency, and control the second frequency of the second digital control signal.

Optionally, the controller is configured to provide the first digital control signal to the power converter system, the first current or the first voltage being dependent on the first digital control signal, and provide the second digital control signal to the switching arrangement, an average current flow through each of the plurality of light sources being dependent on the second digital control signal.

Optionally, the ratio of the average current flow through each of the plurality of light sources is dependent on the second digital control signal.

Optionally, the plurality of light sources comprises a first light source and a second light source, and the plurality of switches comprises a first switch and a second switch, the first switch being coupled to the first light source and the second switch being coupled to the second light source, and the first and second switches are configured to provide an inverse relationship between the average current flowing through the first light source and the average current flowing through the second light source.

Optionally, the first digital control signal is a pulse width modulation (PWM) signal.

Optionally, the driving system comprises an electrical isolation module, the first digital control signal being provided to the lighting apparatus via the electrical isolation module.

Optionally, the electrical isolation module comprises an opto-coupler and/or a digital isolator and/or a transformer.

Optionally, the controller is configured to provide a second digital control signal to the lighting apparatus, the second digital signal having a second duty cycle and a second frequency, and control the second frequency of the second digital control signal.

Optionally, the driving system comprises an electrical isolation module, the first and second digital control signals being provided to the lighting apparatus via the electrical isolation module.

Optionally, the electrical isolation module comprises an isolation element, each of the first and second digital control signals being provided to the lighting apparatus via one of the isolation elements, and each of the isolation elements comprises a least one opto-coupler and/or digital isolator and/or a transformer.

Optionally, the driving system comprises a light setting system configured to provide a first setting signal to the controller, the first digital control signal being dependent on the first setting signal.

Optionally, the light setting system comprises a first dimming source.

Optionally, the first dimming source comprises a first dimmer and/or a first microcontroller unit (MCU).

Optionally, the driving system comprises a light setting system configured to provide a first setting signal and a second setting signal to the controller, the first digital control signal being dependent on the first setting signal and the second digital control signal being dependent on the second setting signal.

Optionally, the light setting system comprises a first dimming source and a second dimming source.

Optionally, the first dimming source comprises a first dimmer and/or a first microcontroller unit (MCU) and/or the second dimming source comprises a second dimmer and/or a second microcontroller unit (MCU).

Optionally, the controller comprises a frequency determination unit configured to determine a first frequency setting for the first frequency of the first digital control signal, and a digital signal generation unit configured to generate the first digital control signal, and set the first frequency of the first digital control signal based on the first frequency setting, thereby controlling the first frequency of the first digital control signal.

Optionally, the controller comprises a detection unit configured to detect a property of the lighting apparatus and the frequency determination unit is configured to determine the first frequency setting based on the detected property of the lighting apparatus.

Optionally, the first frequency setting varies linearly or non-linearly with the property of the lighting apparatus.

Optionally, the digital signal generation unit is configured to set the first frequency setting as a first maximum frequency setting value when the property of the lighting apparatus exceeds a first maximum threshold value, and/or set the first frequency setting as a first minimum frequency setting value when the property of the lighting apparatus is less than a first minimum threshold value.

Optionally, the detection unit comprises a brightness calculation unit configured to determine a brightness of at least one of the plurality of lights sources, and the property of the lighting apparatus is a brightness of at least one of the plurality of light sources, as determined.

Optionally, the brightness is dependent on the first duty cycle.

Optionally, the detection unit comprises a first dimming signal detection unit configured to provide a first duty cycle signal that is representative of the first duty cycle.

Optionally, the first dimming signal detection unit is configured to receive a first setting signal, the first duty cycle signal being dependent on the first setting signal.

Optionally, the digital signal generation unit is configured to set the first duty cycle of the first digital control signal based on the first duty cycle signal.

Optionally, the digital signal generation unit comprises a duty calculation unit configured to receive the first duty cycle signal and to provide a first processed duty cycle signal, and a first on-time calculation unit configured to generate the first digital control signal using the first processed duty cycle signal and the first frequency setting.

Optionally, the digital signal generation unit is configured to limit the first duty cycle to a first maximum duty cycle value and/or a first minimum duty cycle value.

Optionally, the first maximum duty cycle value and/or the first minimum duty cycle value is dependent on the brightness.

Optionally, the controller is configured to provide a second digital control signal to the lighting apparatus, the second digital signal having a second duty cycle and a second frequency, and control the second frequency of the second digital control signal, wherein the digital generation unit is configured to generate the second digital control signal, and set the second frequency of the second digital control signal based on the first frequency setting, thereby controlling the second frequency of the second digital control signal.

Optionally, the controller comprises a detection unit configured to detect a property of the lighting apparatus and the frequency determination unit is configured to determine the first frequency setting based on the detected property of the lighting apparatus.

Optionally, the first frequency setting varies linearly or non-linearly with the property of the lighting apparatus.

Optionally, the digital signal generation unit is configured to set the first frequency setting as a first maximum frequency setting value when the property of the lighting apparatus exceeds a first maximum threshold value, and/or set the first frequency setting as a first minimum frequency setting value when the property of the lighting apparatus is less than a first minimum threshold value.

Optionally, the detection unit comprises a brightness calculation unit configured to determine a brightness of at least one of the plurality of lights sources, and the property of the lighting apparatus is a brightness of at least one of the plurality of light sources, as determined.

Optionally, the brightness is dependent on the first duty cycle and/or the second duty cycle.

Optionally, the detection unit comprises a first dimming signal detection unit configured to provide a first duty cycle signal that is representative of the first duty cycle, and a second dimming signal detection unit configured to provide a second duty cycle signal that is representative of the second duty cycle.

Optionally, the first dimming signal detection unit is configured to receive a first setting signal, the first duty cycle signal being dependent on the first setting signal, and the second dimming signal detection unit is configured to receive a second setting signal, the second duty cycle signal being dependent on the second setting signal.

Optionally, the digital signal generation unit is configured to set the first duty cycle of the first digital control signal based on the first duty cycle signal, and set the second duty cycle of the second digital control signal based on the second duty cycle signal.

Optionally, the digital signal generation unit comprises a duty calculation unit configured to receive the first duty cycle signal and to provide a first processed duty cycle signal, and receive the second duty cycle signal and to provide a second processed duty cycle signal, a first on-time calculation unit configured to generate the first digital control signal using the first processed duty cycle signal and the first frequency setting, and a second on-time calculation unit configured to generate the second digital control signal using the second processed duty cycle signal and the first frequency setting.

Optionally, the digital signal generation unit is configured to limit the first duty cycle to a first maximum duty cycle value and/or a first minimum duty cycle value, and/or limit the second duty cycle to a second maximum duty cycle value and/or a second minimum duty cycle value.

Optionally, the first maximum duty cycle value and/or the first minimum duty cycle value and/or the second maximum duty cycle value and/or the second minimum duty cycle value is dependent on the brightness.

According to a second aspect of the disclosure there is provided an apparatus comprising a lighting apparatus comprising a plurality of light sources, a driving system comprising a controller configured to provide a first digital control signal to the lighting apparatus, the first digital control signal having a first duty cycle and a first frequency, and control the first frequency of the first digital control signal.

It will be appreciated that the apparatus of the second aspect may include features set out in the first aspect and can incorporate other features as described herein.

According to a third aspect of the disclosure there is provided a method of controlling a lighting apparatus comprising a plurality of light sources using a driving system comprising a controller, the method comprising providing a first digital control signal to the lighting apparatus using the controller, the first digital control signal having a first duty cycle and a first frequency, and controlling the first frequency of the first digital control signal, using the controller.

It will be appreciated that the method of the third aspect may include providing and/or using features set out in the first aspect and/or second aspect and can incorporate other features as described herein.

BRIEF DESCRIPTION OF THE DRAWINGS

The disclosure is described in further detail below by way of example and with reference to the accompanying drawings, in which.

DETAILED DESCRIPTION

Figure 2A:
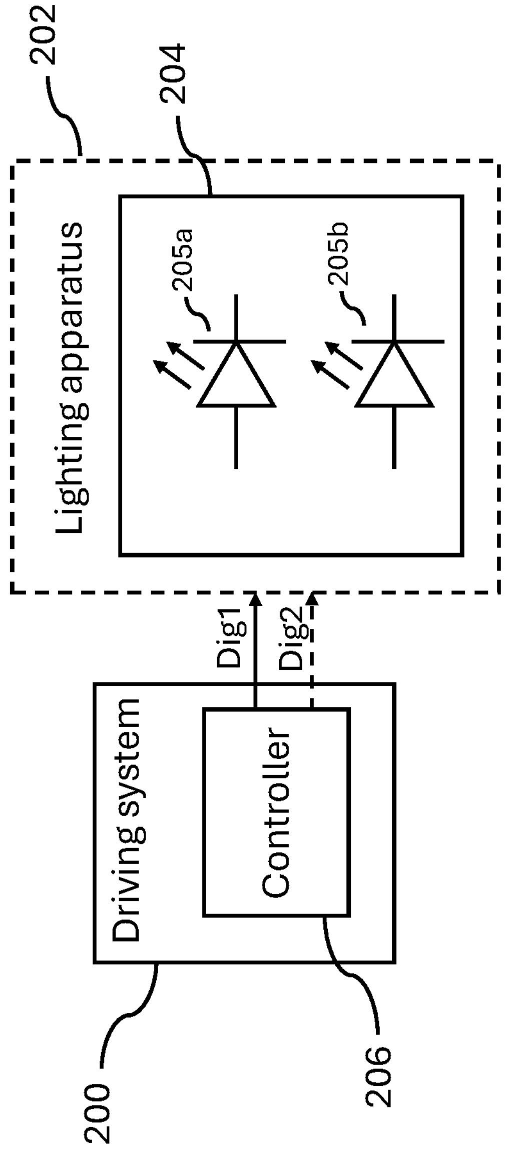
FIG. 2A is a schematic of a driving system for a lighting apparatus in accordance with a first embodiment of the present disclosure.

FIG. 2A is a schematic of a driving system 200 for a lighting apparatus 202 in accordance with a first embodiment of the present disclosure. The lighting apparatus comprises a plurality of light sources 204. The driving system 200 comprises a controller 206. During operation, the controller 206 provides a digital control signal Dig1 to the lighting apparatus 202. The digital control signal Dig1 has a first duty cycle and a first frequency. The controller 206 is configured to control the first frequency of the digital control signal Dig1.

Each of the plurality of light sources 204 may comprise at least one light element such as a light emitting diode (LED). In the present embodiment two light elements 205*a*, 205*b* are shown. In a specific embodiment, each of the plurality of light sources may comprise a plurality of light elements, such as LEDs.

The digital control signal Dig1 may be used to control the brightness of one or more of the light sources 204. The digital control signal Dig1 may, for example, function as described for signals D1 or D2 of FIG. 1.

The controller 206 may be further configured to provide a digital control signal Dig2 to the lighting apparatus 202. The digital control signal Dig2 has a second duty cycle and a second frequency. The controller 206 may be configured to control the second frequency of the digital control signal Dig2.

It will be appreciated that the use of "first" and "second" is non-limiting and may be used to distinguish between features, such as the digital control signals Dig1, Dig2 and their properties.

For example, the digital control signal Dig1 may be referred to as a "first digital control signal" and the digital control signal Dig2 may be referred to as a "second digital control signal". Alternatively, the digital control signal Dig2 may be referred to as a "first digital control signal" and the digital control signal Dig1 may be referred to as a "second digital control signal".

The digital control signal Dig2 may be used to control the brightness of one or more of the light sources 204. The digital control signal Dig2 may, for example, function as described for signals D1 or D2 of FIG. 1.

Figure 2B:
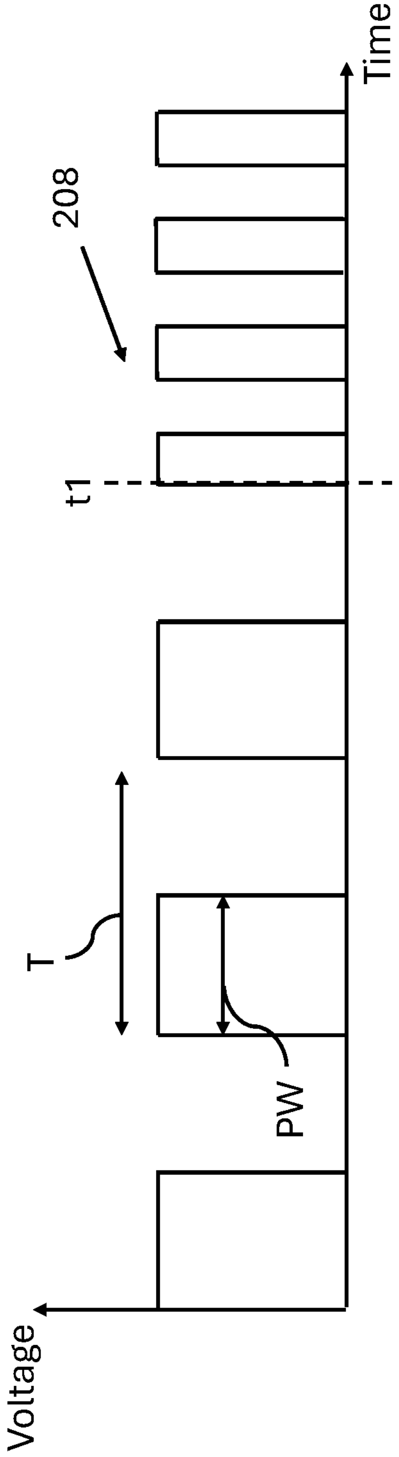
FIG. 2B is a time graph showing an example digital signal.

FIG. 2B is a time graph showing an example digital signal 208. In the present example, the digital signal 208 is a pulse width modulation (PWM) signal. The duty cycle of the signal may be determined as follows:

$$D = \frac{PW}{T} \tag{1}$$

where PW is the pulse width and T is the period. With reference to FIG. 2B, the duty cycle is 0.5. At a time t1, the frequency of the digital signal 208 is increased, whilst the duty cycle remains as 0.5.

One or both of the digital control signals Dig1, Dig2 may exhibit a similar profile to the digital signal 208, in accordance with the understanding of the skilled person.

In consideration of a specific example where the digital signal 208 is representative of the digital signal Dig1, the controller 206 controls the frequency of the digital signal Dig1 such that the frequency is increased at the time t1.

It will be appreciated that in a further embodiment, the controller 206 may act to control the frequency of the digital signal Dig1 such that the frequency is decreased, during operation.

In further embodiments, the controller 206 may act to control the frequency of the digital signal Dig1 such that the frequency can be increased or decreased, during operation.

For example, the controller 206 may increase the frequency at a first time and may decrease the frequency at a second time.

Figure 1:
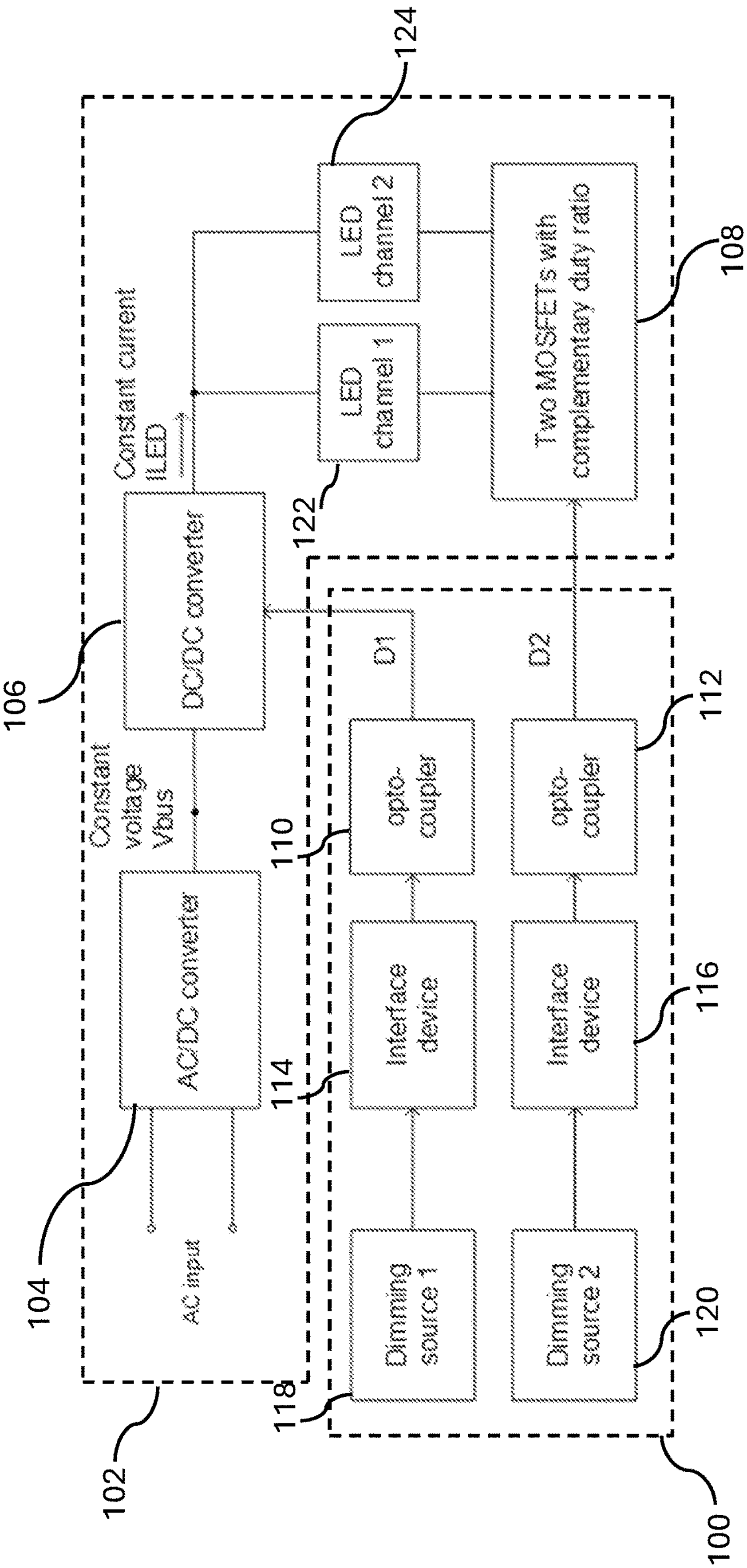
FIG. 1 is a schematic of a known dual channel solid state lighting (SSL) driving system for driving a lighting apparatus.

Known systems such as those shown in FIG. 1, exhibit the following disadvantages:

When the driving frequency for the MOSFET is low, the SSL system will cause camera flicker, which may not be visible to human eyes, but it is clear on a camera. Moreover, it cannot meet the flicker standard.

When the driving frequency for the MOSFET is high, the SSL system cannot achieve a good and deep dimming performance, thereby diminishing the quality of the lighting. The opto-couplers have a time delay, and the delay can cause issues when the dimming frequency is higher.

The system of FIG. 1 only provides fixed frequency operation of the signals D1, D2, and therefore the frequency cannot be controlled.

The driving system 200 comprises the controller 206 which is used to control the frequency of one or more digital control signals Dig1, Dig2, thereby enabling the frequency to be adjusted depending on the requirements of the lighting apparatus 202.

In a specific embodiment, the frequencies of the digital control signals Dig1, Dig2 can be controlled to provide a high driving frequency at high dimming level to avoid camera flicker and meet the flicker standard; and can provide low driving frequency at low dimming level to achieve improved dimming performance that is not affected by the delay of an opto-coupler, thereby resolving the issues of the known systems that operate with a fixed frequency.

Figure 3B:
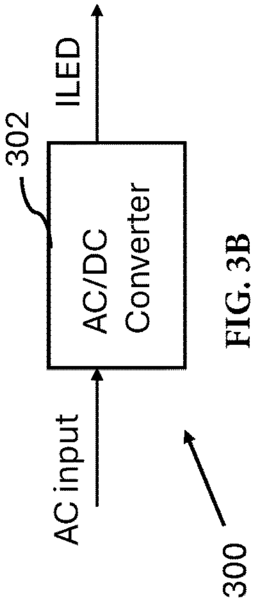
FIG. 3B is a schematic of a specific embodiment of the power converter system.
Figure 3C:
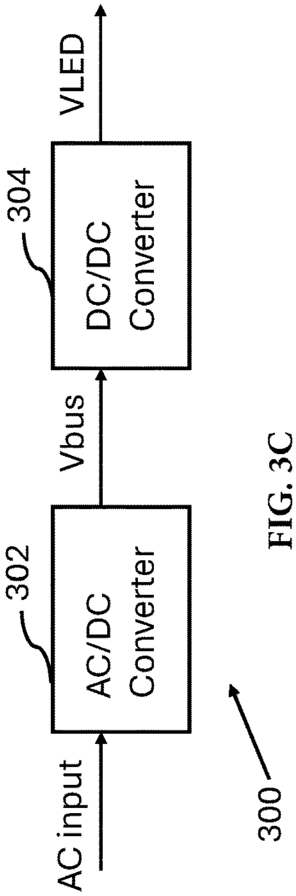
FIG. 3C is a schematic of a further specific embodiment of the power converter system.
Figure 3A:
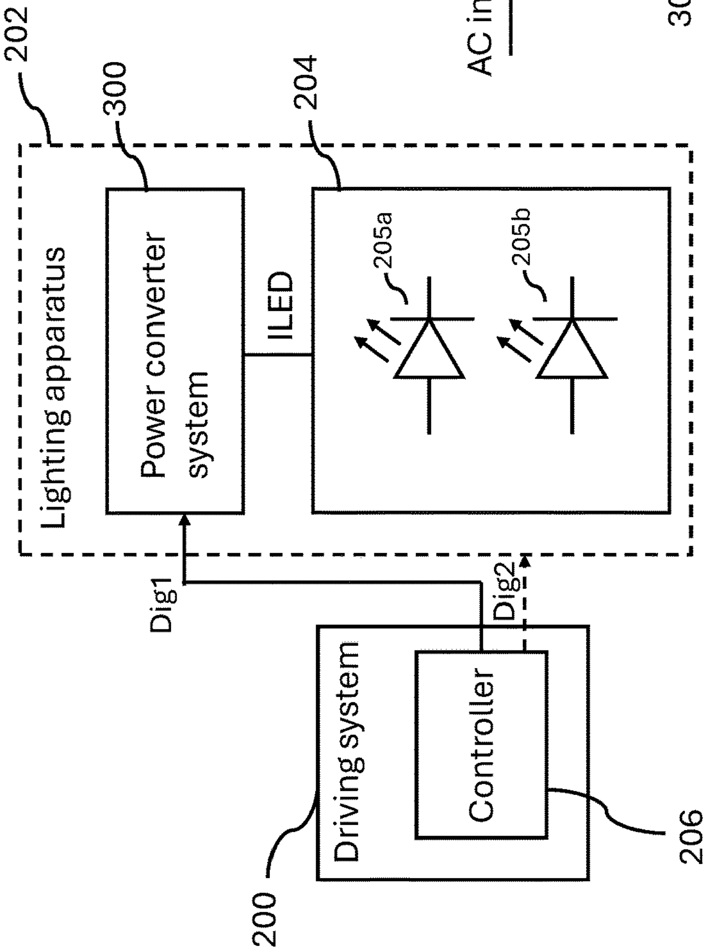
FIG. 3A is a schematic showing a specific embodiment of the lighting apparatus in accordance with a second embodiment of the present disclosure.

FIG. 3A is a schematic showing a specific embodiment of the lighting apparatus 202 in accordance with a second embodiment of the present disclosure. In the present embodiment, the lighting apparatus 202 comprises a power converter system 300 configured to provide a voltage or a current to the light sources 204. In the present example, the power converter system 300 provides a current ILED to the light sources 204. The brightness exhibited by each of the light sources 204 may be dependent on the voltage or current provided to the light source by the power converter system 300.

During operation, the controller 206 provides the digital control signal Dig1 to the power converter system 300. The current or voltage provided by the power converter system 300 is dependent on the digital control signal Dig1. For example, the power converter system 300 may comprise a switching power converter, such as a buck converter, with the digital control signal Dig1 being used to control the switching operation to generate the output voltage or current.

FIG. 3B is a schematic of a specific embodiment of the power converter system 300. In the present embodiment the power converter system 300 comprises an AC/DC converter 302 that may be configured to receive an alternating current (AC) input and to provide a current or a voltage, being the current ILED in the present example.

FIG. 3C is a schematic of a further specific embodiment of the power converter system 300. In the present example, the power converter system 300 further comprises a DC/DC converter 304 that receives a voltage Vbus from the AC/DC converter 302 and provides the current ILED as an output.

Figure 4B:
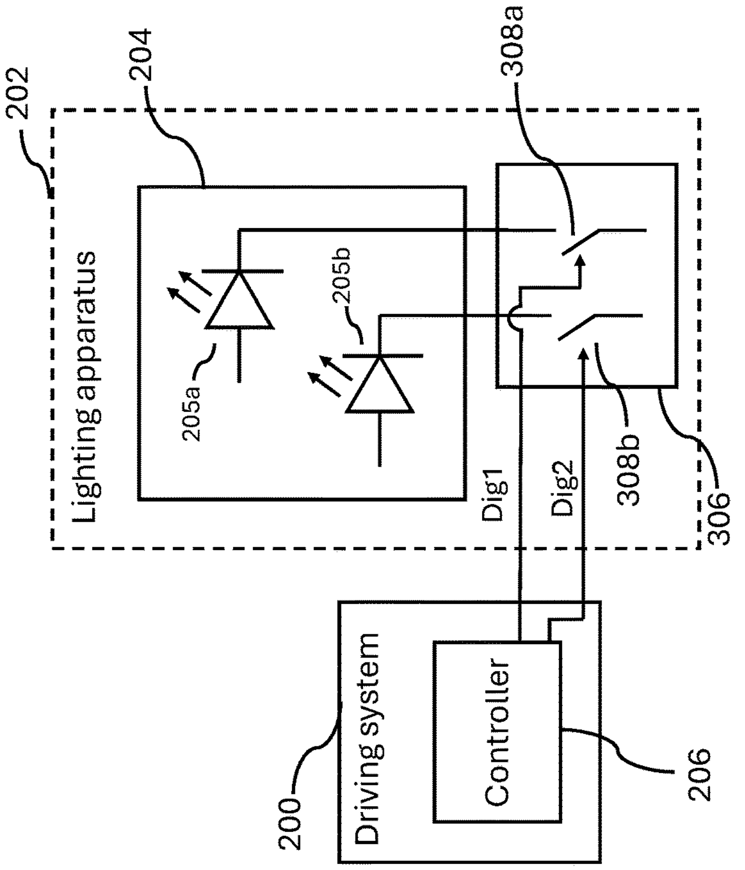
FIG. 4B is a schematic showing a specific embodiment of the controller and the lighting apparatus in accordance with a fourth embodiment of the present disclosure.
Figure 4A:
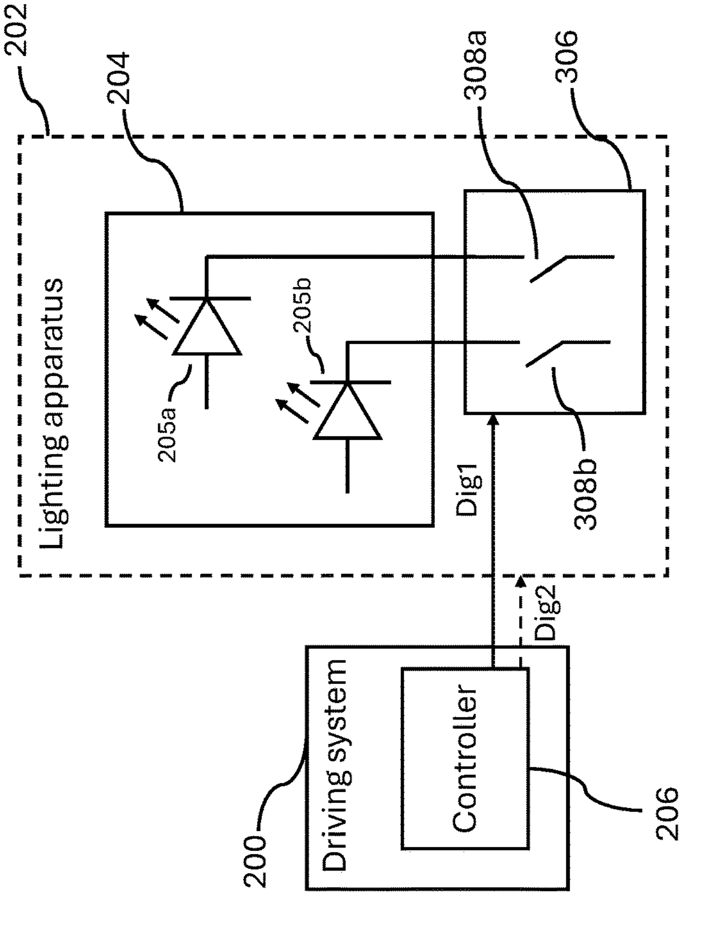
FIG. 4A is a schematic showing a specific embodiment of the lighting apparatus in accordance with a third embodiment of the present disclosure.

FIG. 4A is a schematic showing a specific embodiment of the lighting apparatus 202 in accordance with a third embodiment of the present disclosure. In the present embodiment, the lighting apparatus 202 comprises a switching arrangement 306 comprising a plurality of switches 308*a*, 308*b*. Each of the plurality of switches 308*a*, 308*b* is coupled to one of the light sources 205*a*, 205*b*.

Each of the switches 308*a*, 308*b* may comprise a bipolar junction transistor (BJT) or a metal oxide semiconductor field effect transistor (MOSFET).

The controller 206 is configured to provide the digital control signal Dig1 to the switching arrangement 306. In the present example, the average current flow through each of the of light sources 205*a*, 205*b* is dependent on the digital control signal Dig1.

For example, the switching arrangement 306 may function as described for the MOSFETs 108 of FIG. 1. Specifically, the ratio of the average current flow through each of the plurality of light sources 205*a*, 205*b* may be dependent on the digital control signal Dig1, with the colour temperature being dependent on the ratio. In a specific embodiment there may be an inverse relationship between the average current flowing through the light source 205*a*, and the average current flowing through the light source 205*b*, such that if the average current flow through one of the light sources increases, the other decreases.

FIG. 4B is a schematic showing a specific embodiment of the controller 206 and the lighting apparatus 202 in accordance with a fourth embodiment of the present disclosure. In the present embodiment, the digital control signal dig1 is provided to the switch 308*a* and the digital control signal dig2 is provided to the switch 308*b* during operation of the lighting apparatus 202. The average current flow through the light source 205*a* is dependent on the digital control signal dig1 through the operation of the switch 308*a*, and the average current flow through the light source 205*b* is dependent on the digital control signal dig2 through operation of the switch 308*b*.

Figure 4C:
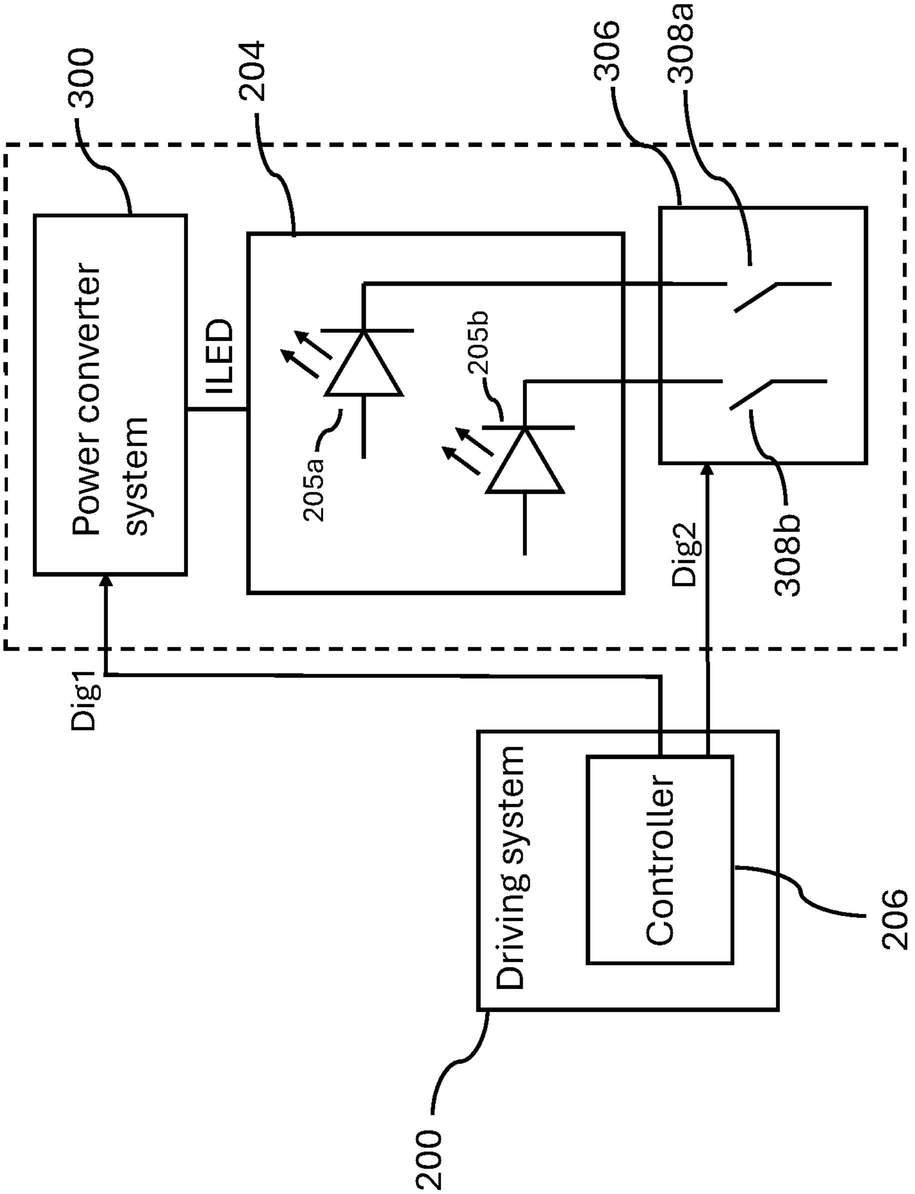
FIG. 4C is a schematic showing a specific embodiment of the controller and the lighting apparatus in accordance with a fifth embodiment of the present disclosure.

FIG. 4C is a schematic showing a specific embodiment of the controller 206 and the lighting apparatus 202 in accordance with a fifth embodiment of the present disclosure. In the present embodiment, the digital control signal Dig1 is provided to the power converter control system 300, and may function as described in relation to any of the embodiments described in relation to FIGS. 3A-3C; and the digital control signal Dig2 is provided to the switching arrangement 306, and may function as described in relation to any of the embodiments described in relation to FIGS. 4A-4B.

It will be appreciated that the present embodiment enables control of both the power converter system 300 and the switching arrangement 306. Specific implementations of the present embodiment may be used to provide control of overall brightness through the power converter system 300, and individual brightness of the light sources 205*a*, 205*b* through the switching arrangement 306, therefore providing brightness and colour temperature control, whilst overcoming issues relating to known systems due to the capability to adjust the frequency of the signals Dig1, Dig2.

Figure 5A:
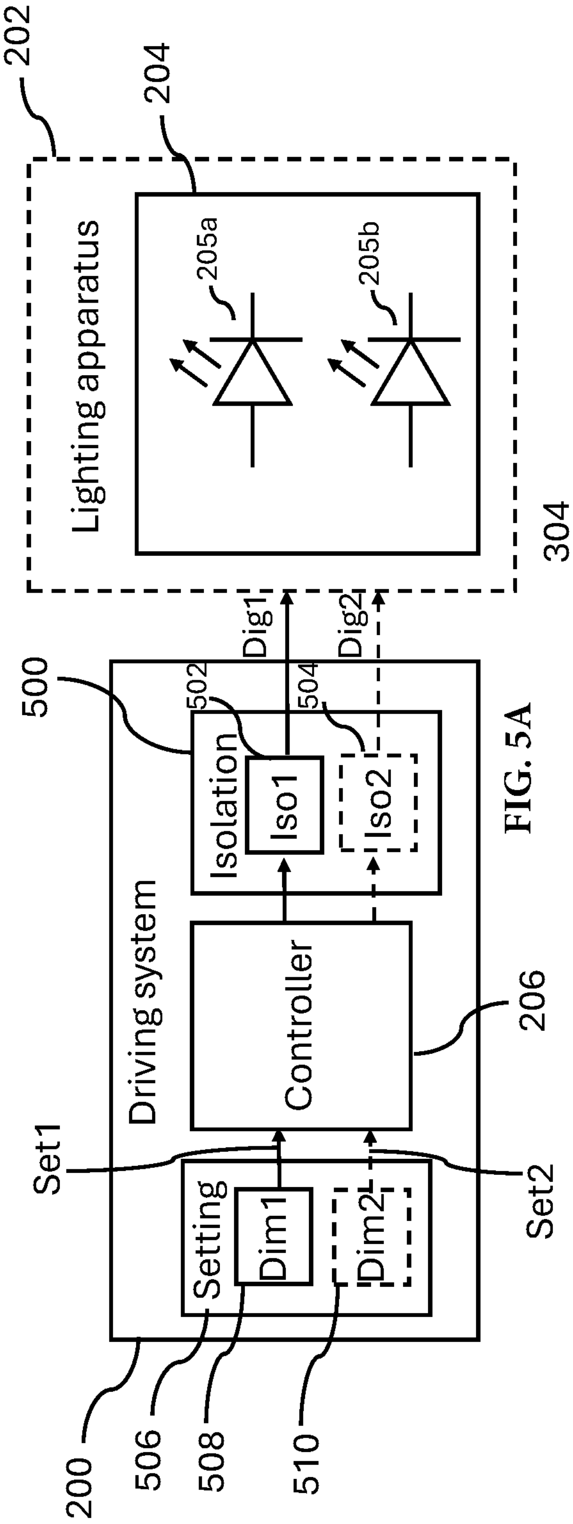
FIG. 5A is a schematic of a specific embodiment of the driving system and the lighting apparatus in accordance with a sixth embodiment of the present disclosure.

FIG. 5A is a schematic of a specific embodiment of the driving system 200 and the lighting apparatus 202 in accordance with a sixth embodiment of the present disclosure.

The driving system 200 comprises an electrical isolation module 500. During operation the digital control signal Dig1 is provided to the lighting apparatus 202 via the electrical isolation module 500. In a specific embodiment, where the controller 206 is configured to provide the digital control signal Dig2, the digital control signal Dig2 may be provided to the lighting apparatus 202 via the electrical isolation module 500.

The electrical isolation module 500 may comprise isolation elements 502, 504 for each of the digital control signals Dig1, Dig2. One or more of the isolation elements 502, 504 may comprise an opto-coupler and/or a digital isolator and/or a transformer.

In a specific embodiment, the driving system 200 may comprise a light setting system 506 that is configured to provide a setting signal Set1 to the controller 206, with the digital control signal Dig1 being dependent on the setting signal Set1. In a further embodiment, the light setting system 506 may be configured to provide a setting signal Set2 to the controller 206, with the digital control signal Dig2 being dependent on the setting signal Set2.

The light setting system 506 may comprise dimming sources 508, 510 for generating the light setting signals Set1, Set2. Each of the dimming sources 508, 510 may comprise a dimmer and/or a microcontroller unit (MCU).

Figure 5B:
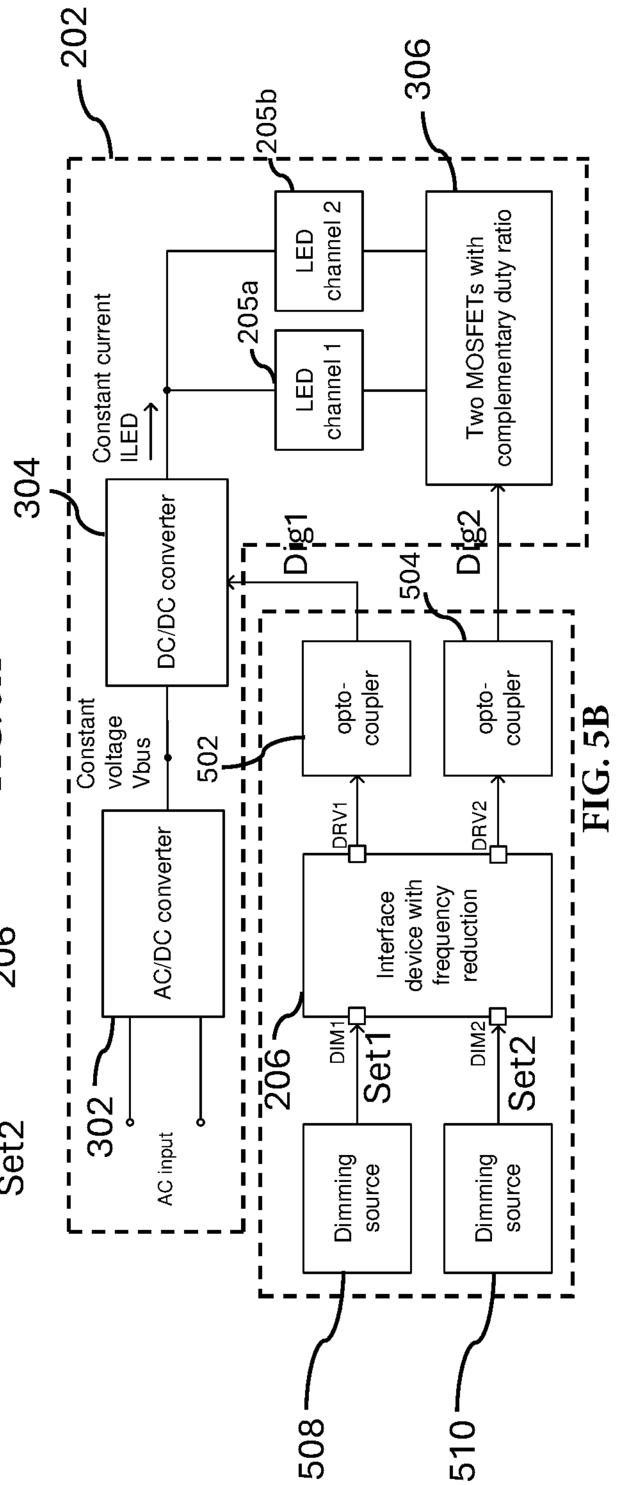
FIG. 5B is a schematic of specific embodiments of the driving circuit and the lighting apparatus in accordance with a seventh embodiment of the present disclosure.

FIG. 5B is a schematic of specific embodiments of the driving circuit 200 and the lighting apparatus 202 in accordance with a seventh embodiment of the present disclosure.

In the present embodiment, the AC/DC converter 302 provides a constant voltage Vbus, the DC/DC converter 304 provides a constant current ILED, and the switch arrangement 306 is implemented using two MOSFETs with complementary duty ratio acts to adjust the duty ratio of LED current. There is also shown two opto-couplers 502, 504 to provide isolation and the controller 206 which, in the present embodiment, functions as an interface device with frequency reduction.

Figure 5C:
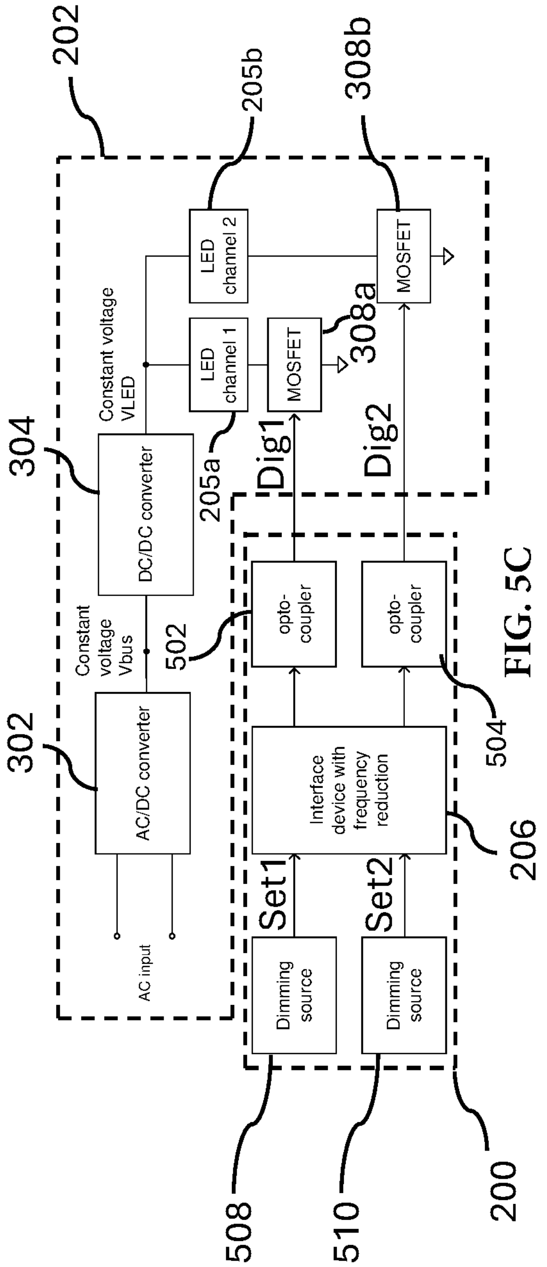
FIG. 5C is a schematic of specific embodiments of the driving circuit and the lighting apparatus in accordance with an eighth embodiment of the present disclosure.

FIG. 5C is a schematic of specific embodiments of the driving circuit 200 and the lighting apparatus 202 in accordance with an eighth embodiment of the present disclosure.

In the present embodiment, the AC/DC converter 302 provides a constant voltage Vbus, the DC/DC converter 304 provides a constant voltage VLED, and the switch arrangement 306 is implemented using two MOSFETs to adjust the duty ratio of LED current. There is also shown two opto-couplers 502, 504 to provide isolation, and the controller 206 which, in the present embodiment, functions as an interface device with frequency reduction.

In a specific embodiment, if the voltage VLED is controlled, then the current through the light elements 205*a*, 205*b* can be measured and the duty ratio can be adjusted so that the average current is maintained. In a further embodiment there may be included a switching circuit that regulates the current flow. The switching circuit preferably provides regulation that is fast in order to not distort the linearity of the relationship between light and duty ratio.

Figure 5D:
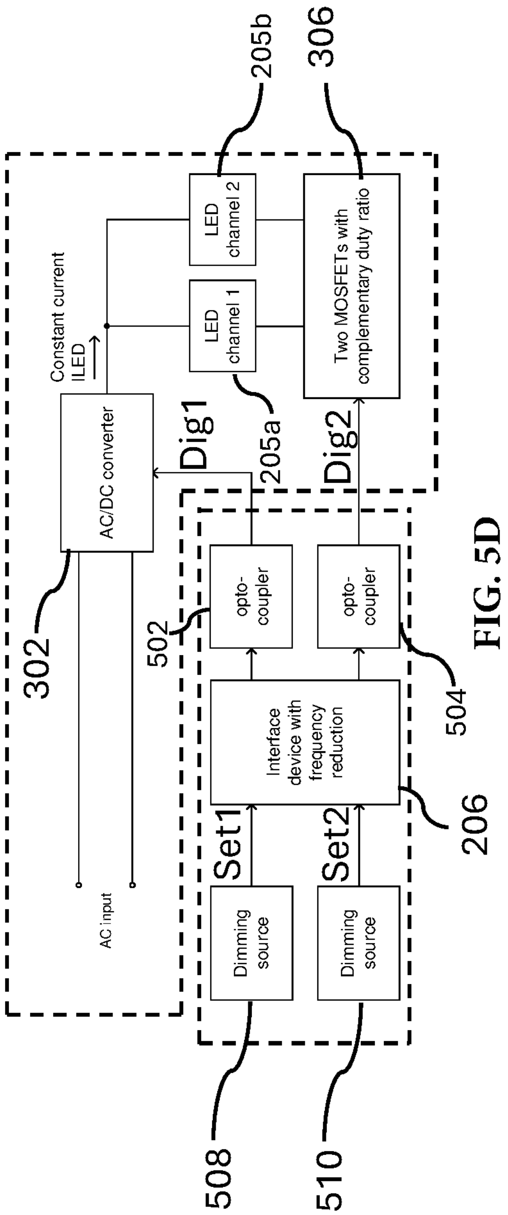
FIG. 5D is a schematic of specific embodiments of the driving circuit and the lighting apparatus in accordance with a ninth embodiment of the present disclosure.

FIG. 5D is a schematic of specific embodiments of the driving circuit 200 and the lighting apparatus 202 in accordance with a ninth embodiment of the present disclosure.

In the present embodiment, the AC/DC converter 302 provides a constant current ILED, and the switching arrangement 306 comprises two MOSFETs with complementary duty ratio to adjust the duty ratio of the LED current ILED. There is also included two opto-couplers 502, 504 to provide isolation, and the controller 206, which, in the present embodiment, functions as an interface device with frequency reduction.

Figure 5E:
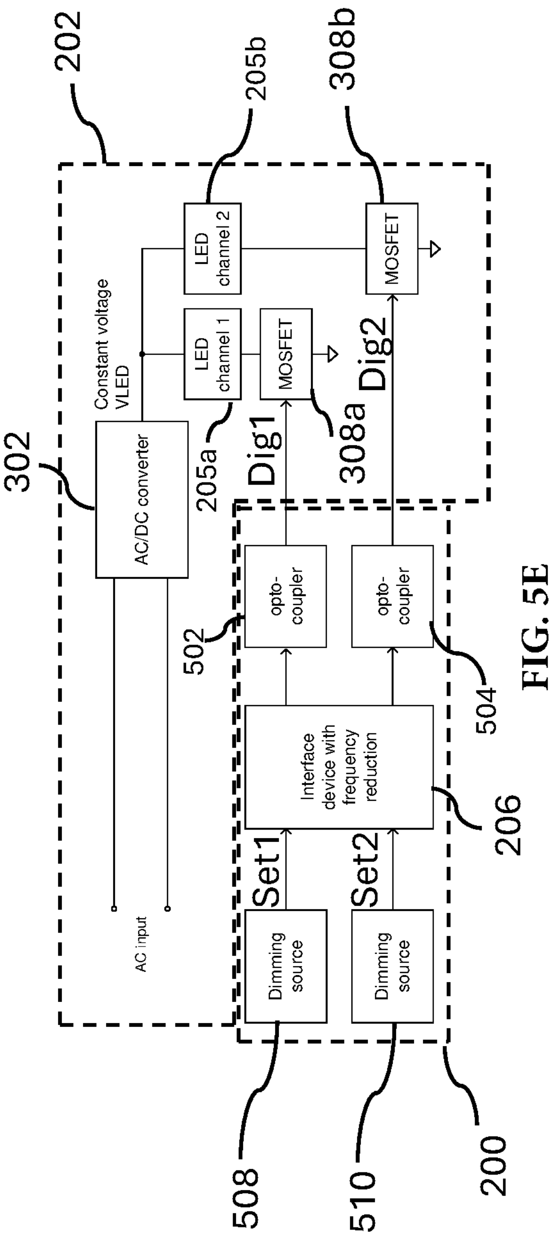
FIG. 5E is a schematic of specific embodiments of the driving circuit and the lighting apparatus in accordance with a tenth embodiment of the present disclosure.

FIG. 5E is a schematic of specific embodiments of the driving circuit 200 and the lighting apparatus 202 in accordance with a tenth embodiment of the present disclosure.

In the present embodiment, the AC/DC converter 302 provides a constant voltage VLED, and the switching arrangement 306 comprises two MOSFETs to adjust the duty ratio of the LED current ILED. There is also included two opto-couplers 502, 504 to provide isolation, and the controller 206, which, in the present embodiment, functions as an interface device with frequency reduction.

Figure 5F:
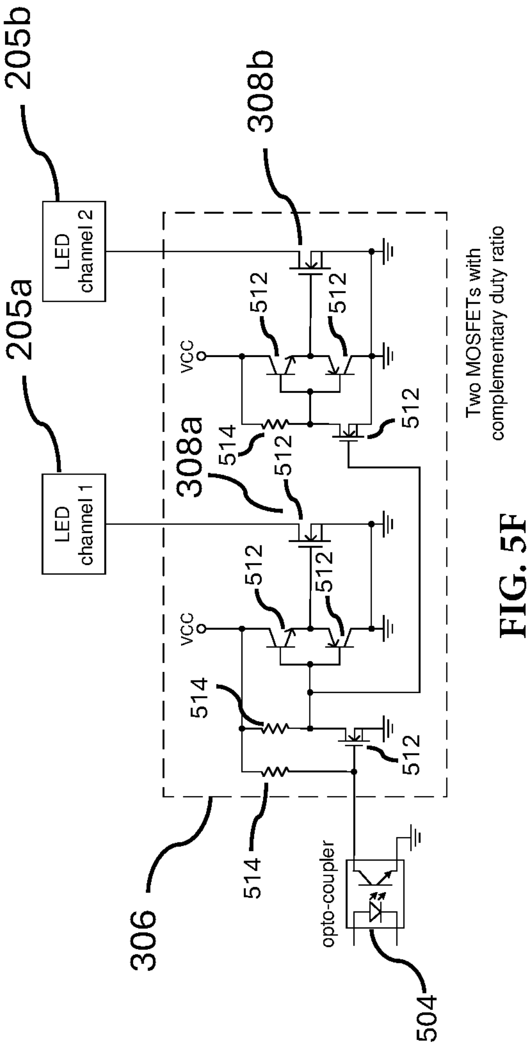
FIG. 5F is a schematic of a specific embodiment of the switching arrangement.

FIG. 5F is a schematic of a specific embodiment of the switching arrangement 306. The switching arrangement 306 of the present embodiment may be used to implement two MOSFETs with complementary duty ratio. The switching arrangement 306 as shown in FIG. 5F may be implemented in any of the embodiments described herein, in accordance with the understanding of the skilled person. In the present embodiment, the switching arrangement comprises transistors 512 and resistors 514. It will be appreciated that in a further embodiment, the MOSFETs of the switching arrangement 306 may alternatively be implemented using other electronic switching devices such as BJTs.

Figure 6A:
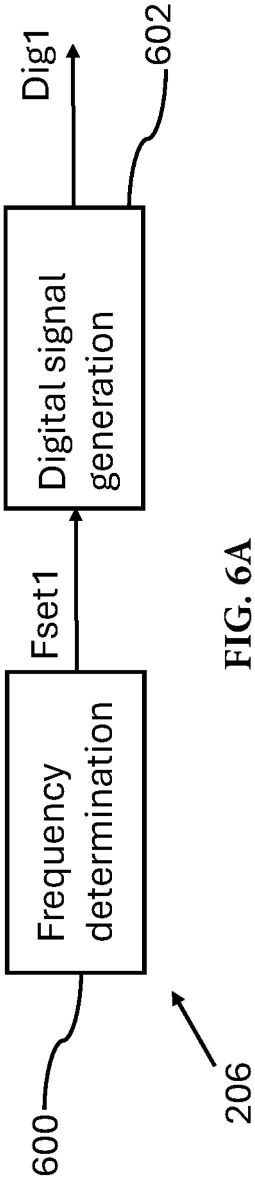
FIG. 6A is a schematic of a specific implementation of the controller in accordance with an eleventh embodiment of the present disclosure.

FIG. 6A is a schematic of a specific implementation of the controller 206 in accordance with an eleventh embodiment of the present disclosure. The controller 206 of the present embodiment may be implemented in any of the embodiments described herein, in accordance with the understanding of the skilled person.

In the present embodiment, the controller 206 comprises a frequency determination unit 600 configured to determine a frequency setting Fset1 for the frequency of the digital control signal Dig1. The controller 206 further comprises a digital signal generation unit 602 configured to generate the digital control signal Dig1, and set the frequency of digital control signal Dig1 based on the frequency setting Fset1, thereby controlling the frequency of the digital control signal Dig1.

In further embodiments having the digital control signal Dig2, the frequency of the digital control signal Dig2 may also be set based on the frequency setting Fset1. In a further embodiment, each of the digital control signals Dig1, Dig2 may have their frequencies set by different frequency settings.

Figure 6B:
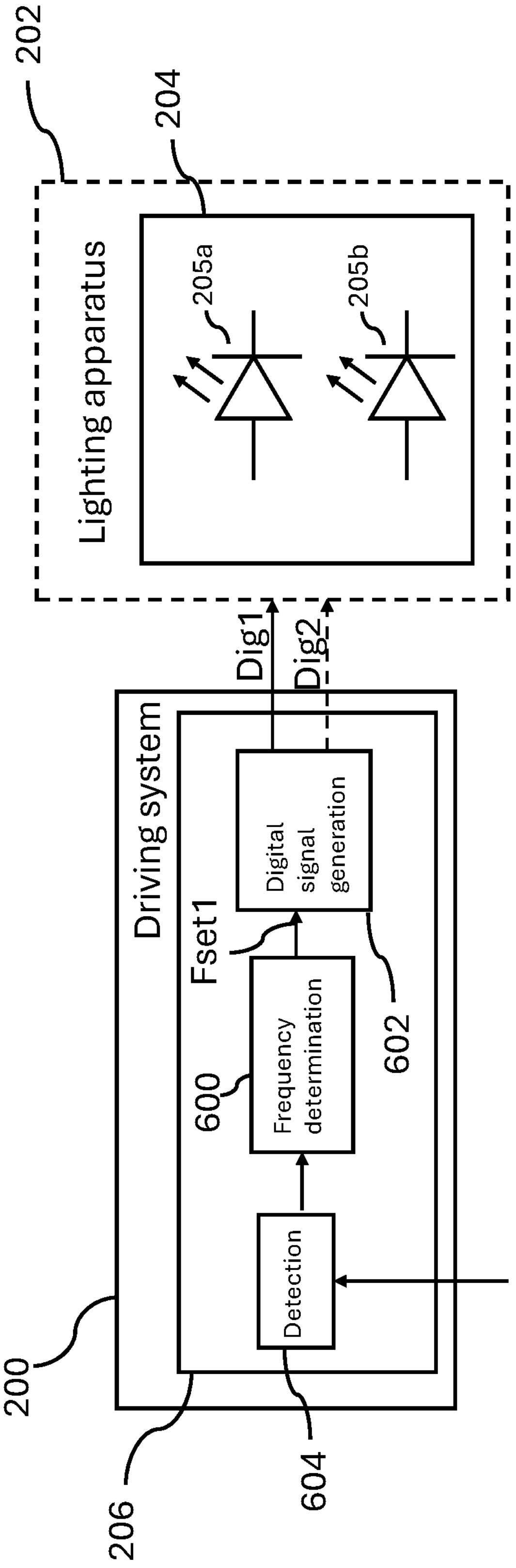
FIG. 6B is a schematic of a specific implementation of the controller in accordance with a twelfth embodiment of the present disclosure.

FIG. 6B is a schematic of a specific implementation of the controller 206 in accordance with a twelfth embodiment of the present disclosure. The controller 206 of the present embodiment may be implemented in any of the embodiments described herein, in accordance with the understanding of the skilled person.

In the present embodiment, the controller 206 comprises a detection unit 604 configured to detect a property of the lighting apparatus 202. The frequency determination unit 600 is configured to determine the frequency setting Fset1 based on the detected property of the lighting apparatus 202.

In specific embodiments, the frequency setting Fset1 may vary linearly or non-linearly with the property of the lighting apparatus 202. For example, if the property is the brightness of one or more of the light sources 204, then the frequency setting Fset1 may decrease with decreasing brightness, with the frequency of the digital signal Dsig1 being decreased based on the frequency setting Fset1.

The digital signal generation unit 602 may be configured to set the frequency setting Fset1 as a maximum frequency setting value when the property of the lighting apparatus exceeds a maximum threshold value, and/or set the frequency setting Fset1 as a minimum frequency setting value when the property of the lighting apparatus 202 is less than a minimum threshold value.

For example, if the property is the brightness, and the brightness falls below the minimum threshold value, then the frequency setting Fset1 may become a fixed value, such that the frequency of the digital control signal Dig1 remains constant as brightness continues to decrease.

Figure 6C:
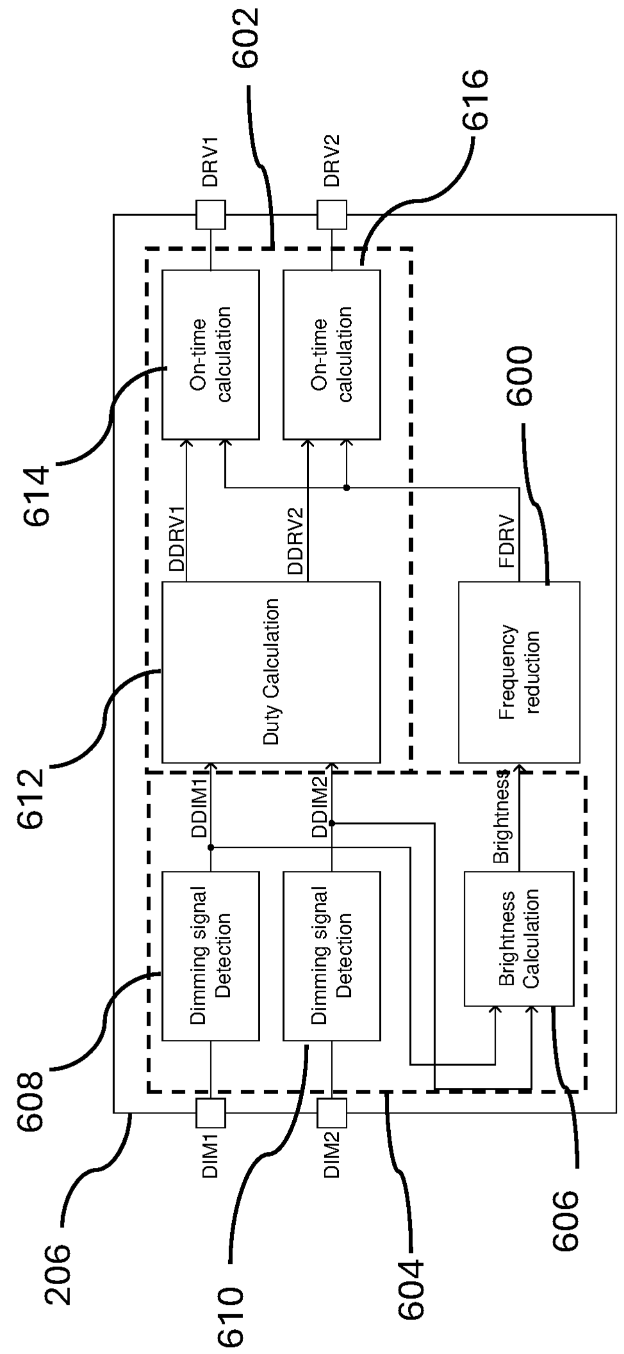
FIG. 6C is a schematic of a specific implementation of the controller in accordance with a thirteenth embodiment of the present disclosure.

FIG. 6C is a schematic of a specific implementation of the controller 206 in accordance with a thirteenth embodiment of the present disclosure. It will be appreciated that the present embodiment of the controller 206 generates the two digital control signals Dig1, Dig2. However, in further embodiments, the controller 206 may generate only one of the digital control signals Dig2, in accordance with the understanding of the skilled person. The controller 206 of the present embodiment may be implemented in any of the embodiments described herein, in accordance with the understanding of the skilled person.

With reference to the variables shown on FIG. 6C, DIM1 refers to the setting signal Set1 as previously described; DIM2 refers to the setting signal Set2, as previously described; FDRV refers to the frequency setting Fset1 as previously described; DRV1 refers to the digital control signal Dig1 as previously described; and DRV2 refers to the digital control signal Dig2 as previously described.

In the present embodiment, the detection unit 604 comprises a brightness calculation unit 606 configured to determine a brightness of at least one of the plurality of lights sources 204. The frequency determination unit 600 is configured to determine the frequency setting FDRV based on the detected property of the lighting apparatus 202, with the property being the brightness, as determined. Brightness may, for example, be determined based on the duty cycle of one or both of the digital control signals DRV1, DRV2. The digital control signals DRV1, DRV2 may be PWM signals.

For implementation of the present controller embodiment in the system presented in FIG. 2B, the digital control signal DRV1 may be for the DC/DC converter 304 to control the brightness (total LED current), with the digital control signal DRV2 being for the switch arrangement 306 to control colour temperature.

In the present embodiment, the detection unit 604 further comprises dimming signal detection units 608, 610. The dimming signal detection unit 608 is configured to provide a duty cycle signal DDIM1 that is representative of the duty cycle of the digital control signal DRV1. The dimming signal detection unit 610 is configured to provide a duty cycle signal DDIM2 that is representative of the duty cycle of the digital control signal DRV2.

In the present embodiment, the dimming signal detection unit 608 is configured to receive the setting signal DIM1, with the duty cycle signal DDIM1 being dependent on the setting signal DIM1. In the present embodiment, the dimming signal detection unit 610 is configured to receive the setting signal DIM2, with the duty cycle signal DDIM2 being dependent on the setting signal DIM2. The setting signals DIM1 and DIM2 may be received from the dimming sources 508 and 510, respectively, as described previously. The setting signals DIM1, DIM2 may, for example, be analog signals or PWM signals.

In the present embodiment, the digital signal generation unit 602 comprises a duty calculation unit 612 configured to receive the duty cycle signals DDIM1, DDIM2 and to provide processed duty cycle signals DDRV1, DDRV2 based on the respective duty cycle signals DDIM1, DDIM2. In the present embodiment, the digital signal generation unit further comprises on-time calculation units 614, 616. The on-time calculation unit 614 is configured to generate the digital control signal DRV1 using the processed duty cycle signal DDRV1 and the frequency setting FDRV. The on-time calculation unit 616 is configured to generate the digital control signal DRV2 using the processed duty cycle signal DDRV2 and the frequency setting FDRV.

In summary, DDRV1 may be the duty cycle of the DRV1 PWM signal; and DDRV2 may be the duty cycle of the DRV2 PWM signal.

In a specific embodiment, the duty calculation unit 612 may generate its output signals based on the following equations:

$$DDRV1 = DDIM1 \tag{2}$$

$$DDRV2 = DDIM2 \tag{3}$$

In a further embodiment, the duty calculation unit 612 may generate its output signals based on the following equations:

$$DDRV1 = DDIM1 \times DDIM2 \tag{4}$$

$$DDRV2 = DDIM1 \times (1 - DDIM2) \tag{5}$$

The brightness calculation unit 606 receives the signals DDIM1 and DDIM2 and generates the signal "Brightness" that represents the brightness information used for the frequency setting FDRV.

In a specific embodiment, Brightness may be as follows:

$$\text{Brightness} = DDIM1 \tag{6}$$

In a further embodiment, Brightness may be as follows:

$$\text{Brightness} = DDIM2 \tag{7}$$

In a further embodiment, Brightness may be as follows:

$$\text{Brightness} = DDIM1 + DDIM2 \tag{8}$$

In a further embodiment, Brightness may be as follows:

$$\text{Brightness} = DDIM1 - DDIM2 \tag{9}$$

In a further embodiment, Brightness may be as follows:

$$\text{Brightness} = DDIM1 \times DDIM2 \tag{10}$$

In a further embodiment, Brightness may be as follows:

$$\text{Brightness} = DDIM1 \div DDIM2 \tag{11}$$

In operation, the frequency determination unit 600 receives the signal "Brightness", and then generates a corresponding output frequency, provided as the frequency setting FDRV.

The on-time calculation units 614, 616 both receive FDRV. The on-time calculation unit 614 receives DDRV1 and generates the digital control signal DRV1 and the on-time calculation unit 616 receives DDRV2 and generates the digital control signal DRV2.

Figure 7A:
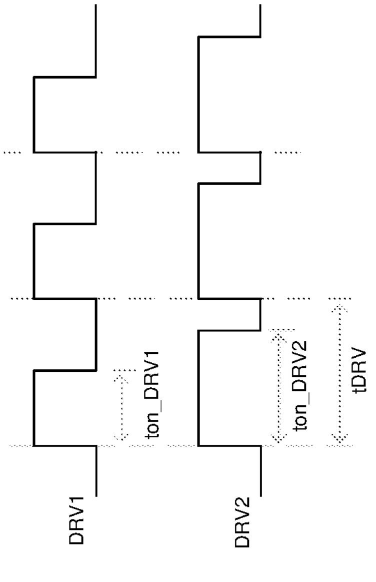
FIG. 7A is a timing graph showing example waveforms of the digital control signals as may be generated from the controller of FIG. 6C.

FIG. 7A is a timing graph showing example waveforms of the digital control signals DRV1, DRV2 as may be generated from the controller 206 of FIG. 6C. In the graph, ton_DRV1 is the on time of the digital control signal DRV1, ton_DRV2 is the on time of the digital control signal DRV2, and tDRV is the period of the signals DRV1, DRV2.

Quantities described herein may be represented by the following equations:

$$FDRV = \frac{1}{tDRV} \quad (12)$$

$$DDRV1 = \frac{\text{ton\_DRV1}}{tDRV} \quad (13)$$

$$DDRV2 = \frac{\text{ton\_DRV2}}{tDRV} \quad (14)$$

Figure 7B:
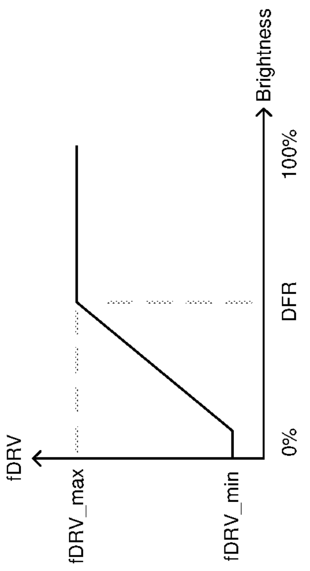
FIG. 7B is a graph showing the frequency variation with brightness, for an example embodiment of the present disclosure.

FIG. 7B is a graph showing the frequency variation with brightness, for an example embodiment of the present disclosure. The following parameters are shown on the graph:

DFR is the boundary brightness level for frequency reduction fDRV_max is the maximum output frequency fDRV_min is the minimum output frequency DFR, fDRV_max, and fDRV_min may be fixed or configurable by users. In further embodiments, fDRV_min and/or fDRV_max may be omitted.

When the signal Brightness is higher than DFR, the output frequency is equal to the maximum frequency fDRV_max. When the signal Brightness is lower than DFR, the output frequency decreases with Brightness. The formula of fDRV and Brightness is as follows:

$$fDRV = \text{fDRV\_max} \times \left(\frac{\text{Brightness}}{DFR}\right) \quad (15)$$

It should be noted that fDRV corresponds to FDRV as previously described. In further embodiments, the formula of fDRV and Brightness may, for example, be linear, piecewise linear, or a quadratic curve.

Figure 7C:
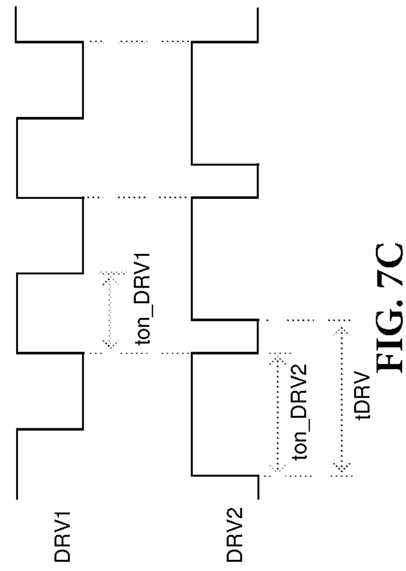
FIG. 7C is a timing graph showing example waveforms of the digital control signals as may be generated from the controller of FIG. 6C in a further embodiment of the present disclosure.

FIG. 7C is a timing graph showing example waveforms of the digital control signals DRV1, DRV2 as may be generated from the controller 206 of FIG. 6C in a further embodiment of the present disclosure. In the present example, the rising edges of DRV1 is aligned with the falling edges of DRV2.

Figure 7D:
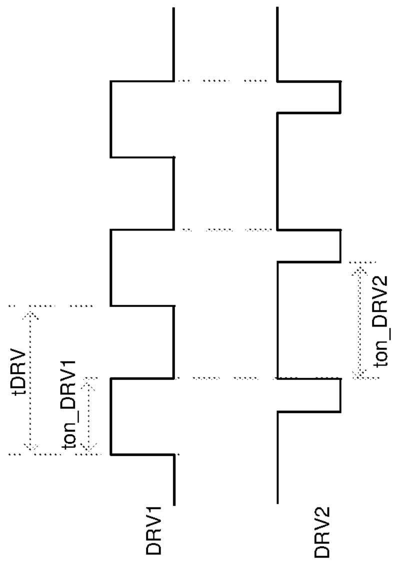
FIG. 7D is a timing graph showing example waveforms of the digital control signals as may be generated from the controller of FIG. 6C in a further embodiment of the present disclosure.

FIG. 7D is a timing graph showing example waveforms of the digital control signals DRV1, DRV2 as may be generated from the controller 206 of FIG. 6C in a further embodiment of the present disclosure. In the present example, the falling edges of DRV1 is aligned with the rising edges of DRV2.

Figure 7F:
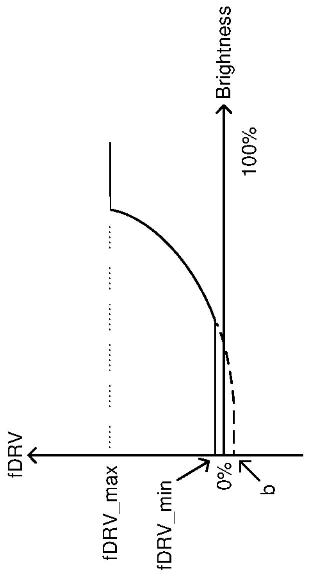
FIG. 7F is a graph showing the frequency variation with brightness, for a further example embodiment of the present disclosure.
Figure 7H:
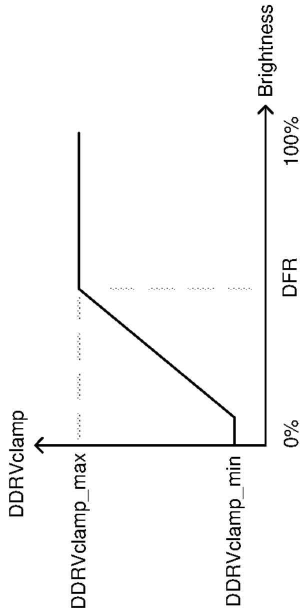
FIG. 7H is a graph showing the variation in the minimum duty cycle value with Brightness.
Figure 7E:
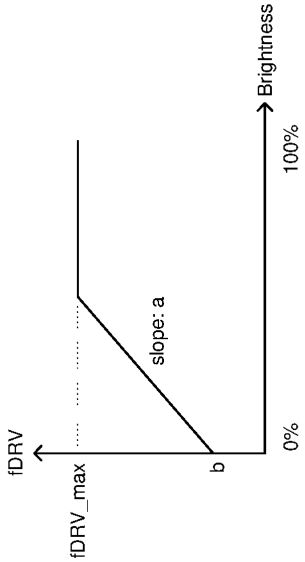
FIG. 7E is a graph showing the frequency variation with brightness, for a further example embodiment of the present disclosure.

FIG. 7E is a graph showing the frequency variation with brightness, for a further example embodiment of the present disclosure. The curve has the following formula:

$$fDRV = a \times \text{Brightness} + b \quad (16)$$

FIG. 7F is a graph showing the frequency variation with brightness, for a further example embodiment of the present disclosure. The curve has the following formula:

$$fDRV = a \times (\text{Brightness})^2 + b \quad (17)$$

If b<0, fDRV_min is required.

In a further embodiment, the digital signal generation unit 602 is configured to limit the duty cycle of the digital control signal DRV1 to a first maximum duty cycle value and/or a first minimum duty cycle value, and/or limit the duty cycle of the digital control signal DRV2 to a second maximum duty cycle value and/or a second minimum duty cycle value.

The first maximum duty cycle value and/or the first minimum duty cycle value and/or the second maximum duty cycle value and/or the second minimum duty cycle value may be dependent on the brightness.

Figure 7G:
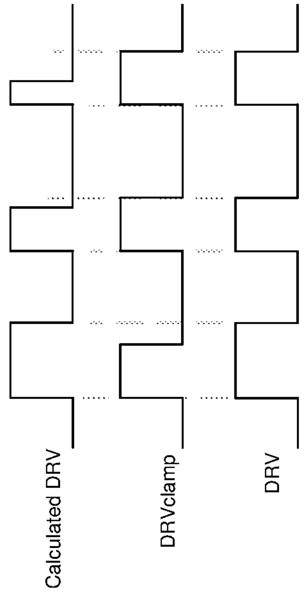
FIG. 7G is a timing graph showing example waveforms of a digital control signals as may be generated from the controller of FIG. 6C in a further embodiment of the present disclosure.

FIG. 7G is a timing graph showing example waveforms of a digital control signals DRV as may be generated from the controller 206 of FIG. 6C in a further embodiment of the present disclosure, where DRV may be one or both of the digital control signals DRV1, DRV2 as described previously. FIG. 7G shows the conceptual waveforms of the minimum duty clamp.

Calculated DRV may correspond to one of DDRV1, DDRV2 as discussed previously, or may be internal to the duty calculation unit 612. DRVclamp is the minimum duty cycle value for the digital control signal DRV.

FIG. 7H is a graph showing the variation in the minimum duty cycle value DDRVclamp with Brightness.

DDRVclamp is the minimum duty clamp of DDRV. When the calculated DDRV is shorter than DDRVclamp, it will be clamped to DDRVclamp.

DDRVclamp_max is the maximum DDRVclamp.

DDRVclamp_min is the minimum DDRVclamp. In a specific embodiment, DDRVclamp_min may be optional.

DDRVclamp_max and DDRVclamp_min can be fixed or may be configurable by users.

When the signal Brightness is lower than DFR, the output frequency decreases with Brightness, and DDRVclamp decreases as well.

The formula of DDRVclamp and Brightness is:

$$DDRVclamp = \text{DDRVclamp\_max} \times (\text{Brightness}/DFR) \quad (18)$$

The formula of DDRVclamp and frequency is:

$$DDRVclamp = \text{DDRVclamp\_max} \times (fDRV/\text{fDRV\_max}) \quad (19)$$

The present embodiment can provide a minimum duty ratio limitation. When the calculated output duty ratio is lower than the minimum duty ratio clamp, the device will output the minimum duty ratio to make sure the duty ratio will not be affected by the non-ideal characteristics of the opto-coupler. The minimum duty ratio is related to the non-ideal characteristics of the opto-coupler, so it may be decreased with the frequency.

Various improvements and modifications can be made to the above without departing from the scope of the disclosure.

The invention claimed is:

1. A driving system for a lighting apparatus comprising a plurality of light sources, the driving system comprising a controller configured to:

provide a first digital control signal to the lighting apparatus, the first digital control signal having a first duty cycle and a first frequency; and control the first frequency of the first digital control signal to increase or decrease the first frequency, wherein the controller comprises:
a frequency determination unit configured to determine a first frequency setting for the first frequency of the first digital control signal;
a digital signal generation unit configured to:
generate the first digital control signal; and
set the first frequency of the first digital control signal based on the first frequency setting, thereby controlling the first frequency of the first digital control signal; and
a detection unit configured to detect a property of the lighting apparatus, wherein the frequency determination unit is configured to determine the first frequency setting based on the detected property of the lighting apparatus, the detection unit comprises a brightness calculation unit configured to determine a brightness of at least one of the plurality of lights sources, and the property of the lighting apparatus is a brightness of at least one of the plurality of light sources.

2. The driving system of claim 1, wherein the lighting apparatus comprises a power converter system configured to provide a first voltage or a first current to the plurality of light sources.

3. The driving system of claim 2, wherein a brightness of the lighting apparatus is dependent on the first voltage or the first current.

4. The driving system of claim 2, wherein: the controller is configured to provide the first digital control signal to the power converter system; and the first current or the first voltage is dependent on the first digital control signal.

5. The driving system of claim 1, wherein the lighting apparatus comprises a switching arrangement comprising a plurality of switches, each of the plurality of switches being coupled to at least one of the plurality of light sources.

6. The driving system of claim 5, wherein:
the controller is configured to provide the first digital control signal to the switching arrangement; and
an average current flow through each of the plurality of light sources is dependent on the first digital control signal.

7. The driving system of claim 6, wherein a ratio of the average current flow through each of the plurality of light sources is dependent on the first digital control signal.

8. The driving system of claim 5, wherein the controller is configured to:
provide a second digital control signal to the lighting apparatus, the second digital control signal having a second duty cycle and a second frequency; and
control the second frequency of the second digital control signal to increase or decrease the first frequency.

9. The driving system of claim 8, wherein:
the plurality of light sources comprises a first light source and a second light source;
the plurality of switches comprises a first switch and a second switch, the first switch being coupled to the first light source and the second switch being coupled to the second light source; and
the controller is configured to:
provide the first digital control signal to the first switch, an average current flow through the first light source being dependent on the first digital control signal; and
provide the second digital control signal to the second switch, an average current flow through the second light source being dependent on the second digital control signal.

10. The driving system of claim 5, wherein the lighting apparatus comprises a power converter system configured to provide a first voltage or a first current to the plurality of light sources.

11. The driving system of claim 10, wherein the controller is configured to:
provide a second digital control signal to the lighting apparatus, the second digital control signal having a second duty cycle and a second frequency; and
control the second frequency of the second digital control signal.

12. The driving system of claim 11, wherein the controller is configured to: provide the first digital control signal to the power converter system, the first current or the first voltage being dependent on the first digital control signal; and provide the second digital control signal to the switching arrangement, an average current flow through each of the plurality of light sources being dependent on the second digital control signal.

13. The driving system of claim 1, wherein the digital signal generation unit is configured to:
set the first frequency setting as a first maximum frequency setting value when the property of the lighting apparatus exceeds a first maximum threshold value; and/or
set the first frequency setting as a first minimum frequency setting value when the property of the lighting apparatus is less than a first minimum threshold value.

14. The driving system of claim 1, wherein the brightness is dependent on the first duty cycle.

15. The driving system of claim 14, wherein the detection unit comprises a first dimming signal detection unit configured to provide a first duty cycle signal that is representative of the first duty cycle.

16. The driving system of claim 15, wherein the digital signal generation unit comprises:
a duty calculation unit configured to receive the first duty cycle signal and to provide a first processed duty cycle signal; and
a first on-time calculation unit configured to generate the first digital control signal using the first processed duty cycle signal and the first frequency setting.

17. The driving system of claim 16, wherein the digital signal generation unit is configured to limit the first duty cycle to a first maximum duty cycle value and/or a first minimum duty cycle value.

18. An apparatus comprising:
a lighting apparatus comprising a plurality of light sources; and
a driving system comprising a controller configured to:
provide a first digital control signal to the lighting apparatus, the first digital control signal having a first duty cycle and a first frequency; and
control the first frequency of the first digital control signal to increase or decrease the first frequency, wherein the controller comprises:
a frequency determination unit configured to determine a first frequency setting for the first frequency of the first digital control signal;

a digital signal generation unit configured to:

generate the first digital control signal; and set the first frequency of the first digital control signal based on the first frequency setting, thereby controlling the first frequency of the first digital control signal; and a detection unit configured to detect a property of the lighting apparatus, wherein the frequency determination unit is configured to determine the first frequency setting based on the detected property of the lighting apparatus, the detection unit comprises a brightness calculation unit configured to determine a brightness of at least one of the plurality of lights sources, and the property of the lighting apparatus is a brightness of at least one of the plurality of light sources.

19. A method of controlling a lighting apparatus comprising a plurality of light sources using a driving system comprising a controller, the method comprising:

providing a first digital control signal to the lighting apparatus using the controller, the first digital control signal having a first duty cycle and a first frequency; and controlling the first frequency of the first digital control signal, using the controller to increase or decrease the first frequency, operating a frequency determination unit in the controller to determine a first frequency setting for the first frequency of the first digital control signal;

operating a digital signal generation unit in the controller to generate the first digital control signal and set the first frequency of the first digital control signal based on the first frequency setting, thereby controlling the first frequency of the first digital control signal;

operating a detection unit in the controller to detect a property of the lighting apparatus, wherein operating the frequency determination unit is configured to determine the first frequency setting is based on the detected property of the lighting apparatus; and operating a brightness calculation unit in the detection unit to determine a brightness of at least one of the plurality of lights sources, wherein the property of the lighting apparatus is a brightness of at least one of the plurality of light sources.

* * * * *